United States Patent
Sulem et al.

(10) Patent No.: US 9,257,775 B2
(45) Date of Patent: *Feb. 9, 2016

(54) CHARGER DEVICE FOR A PORTABLE ELECTRONIC DEVICE

(71) Applicant: BLACKBERRY LIMITED, Waterloo (CA)

(72) Inventors: Firmansyah Kuncoko Sulem, Waterloo (CA); Felipe Oliveira Simoes, Kitchener (CA); Dietmar Frank Wennemer, Waterloo (CA)

(73) Assignee: BlackBerry Limited, Waterloo (CA)

( * ) Notice: Subject to any disclaimer, the term of this patent is extended or adjusted under 35 U.S.C. 154(b) by 99 days.

This patent is subject to a terminal disclaimer.

(21) Appl. No.: 14/109,793

(22) Filed: Dec. 17, 2013

(65) Prior Publication Data
US 2014/0170873 A1    Jun. 19, 2014

Related U.S. Application Data

(63) Continuation of application No. 12/912,598, filed on Oct. 26, 2010, now Pat. No. 8,638,064.

(51) Int. Cl.
*H02J 7/02* (2006.01)
*H01R 13/44* (2006.01)
*H01R 24/28* (2011.01)
*H02J 7/00* (2006.01)

(52) U.S. Cl.
CPC ............... *H01R 13/44* (2013.01); *H01R 24/28* (2013.01); *H02J 7/0042* (2013.01)

(58) Field of Classification Search
CPC ............................... H02J 7/0042; H01R 24/28
USPC .......... 320/107, 111, 115; 439/131, 626, 628, 439/744, 835
See application file for complete search history.

(56) References Cited

U.S. PATENT DOCUMENTS

| | | | |
|---|---|---|---|
| 3,945,040 | A | 3/1976 | Staar |
| 4,340,267 | A | 7/1982 | Nukaga |
| 4,445,739 | A | 5/1984 | Wooten |
| 4,810,199 | A | 3/1989 | Kar |
| 5,030,119 | A | 7/1991 | Lowe |
| 5,046,961 | A | 9/1991 | Hoffman |
| 5,108,297 | A | 4/1992 | Hoffman et al. |
| 5,518,411 | A | 5/1996 | Belleci |

(Continued)

FOREIGN PATENT DOCUMENTS

| | | |
|---|---|---|
| EP | 1484777 A1 | 12/2004 |
| WO | 2006016119 A2 | 2/2006 |

OTHER PUBLICATIONS

Printout of "USB Flash Drive Review", retrieved on Dec. 2, 2010 from http://usb-flash-drive-review.toptenreviews.com.

(Continued)

*Primary Examiner* — Edward Tso
*Assistant Examiner* — Aaron Piggush
(74) *Attorney, Agent, or Firm* — Geoffrey deKleine; Borden Ladner Gervais LLP

(57) ABSTRACT

A device having an electrical plug, such as a charger device, includes a locking member coupled to a carriage that is movable into a housing. Prongs of the device are movable between a retracted position and an extended position along two different travel paths by actuating the prongs or by actuating the carriage.

14 Claims, 15 Drawing Sheets

(56) References Cited

U.S. PATENT DOCUMENTS

| | | | |
|---|---|---|---|
| 5,599,196 | A | 2/1997 | Powell et al. |
| 5,628,641 | A | 5/1997 | Hahn |
| 6,604,954 | B2 | 8/2003 | Chu et al. |
| 6,808,400 | B2 | 10/2004 | Tu |
| 6,854,989 | B2 | 2/2005 | Milan |
| 7,044,759 | B2 | 5/2006 | Hughes |
| 7,131,852 | B1 * | 11/2006 | Chen ............................ 439/131 |
| 7,425,132 | B2 | 9/2008 | Yang et al. |
| 7,445,479 | B2 | 11/2008 | Fan et al. |
| 7,494,350 | B1 | 2/2009 | Lee |
| 2007/0293059 | A1 * | 12/2007 | Yang et al. ........................ 439/4 |

OTHER PUBLICATIONS

Printout of "Kensington Travel Plug Adapter with USB Charger", retrieved on Dec. 2, 2010 from http://www.geek.com/articles/xyzcomputing/kensington-travel-plug-adapter-with-usb-charger-20060612/.

Printout of "World Travel Adapter with USB", retrieved on Dec. 2, 2010 from http://www.retractacable.com/product_info.php?products_id=208.

Extended European Search Report dated Dec. 27, 2010, issued from the corresponding European patent application No. 10188867.5.

Extended European Search Report dated Feb. 21, 2013, issued against corresponding European patent application No. 12184847.7.

* cited by examiner

CHARGER DEVICE FOR A PORTABLE ELECTRONIC DEVICE

TECHNICAL FIELD

The present embodiments relate to electrical devices having an electrical plug with prongs to interface with an electrical outlet or receptacle, such as charger devices having stowable prongs.

BACKGROUND

Many different types of portable electronic devices are currently available including: personal data assistants (PDAs), smart phones, handheld computers, two-way pagers, music players and cellular telephones, for example. These portable electronic devices are typically powered by rechargeable power packs, which may include rechargeable batteries, such as rechargeable lithium-ion or nickel cadmium batteries, for example. Rechargeable power packs may be re-charged from a low charge state using a charger that plugs into an electrical wall outlet and the portable electronic device.

Some electrical devices having an electrical outlet with prongs that interface with an electrical receptacle, and that have stowable prongs, that is, prongs that are deployed during use and that are stowed when not in use. An illustrative device that may benefit from stowable prongs is a charger device that provides power to or recharges a power pack of a portable electronic device as described above. In general, charger devices having stowable prongs are smaller than devices having permanently deployed prongs. By reducing the size of the charger device, transportation of the charger device is more convenient for users.

DRAWINGS

The following figures set forth embodiments of the invention in which like reference numerals denote like parts. Embodiments of the invention are illustrated by way of example and not by way of limitation in the accompanying figures.

DETAILED DESCRIPTION

The concepts described herein may be applied to variety of electrical devices, but for convenience, the concepts will be described with reference to a charger. In addition, the concepts will be described herein with respect to electrical plugs similar to those used in North America, having bladed prongs without a grounding connector. The concepts may be adapted to electrical plugs having grounding connectors. The concepts may further be applicable to plugs used outside of North America. Furthermore, the term "prongs" as used herein encompasses a variety of male electrical connectors, whether they are blades, round pins, half-round pins, rectangular pins or any other conformation.

In an aspect there is provided a charger device including: a housing; prongs for engaging an electrical outlet, the prongs being coupled to one another by a cross-member and movable relative to the housing between a retracted position in which the prongs are received in the housing and an extended position in which the prongs protrude from the housing, the prongs being biased toward the extended position; a projection extending from a side of the cross-member; a locking member coupled to a carriage for moving into and out of engagement with the projection and being pivotable, the locking member comprising a rib separating a first travel path and a second travel path, the locking member being biased toward a non-pivoted position by a locking member spring and the carriage being biased toward a first position; and electrical components for electrically communicating with a portable electronic device to enable charging of a power pack of the portable electronic device; wherein the prongs are movable from the retracted position to the extended position along the first travel path and along the second travel path.

Figure 1:
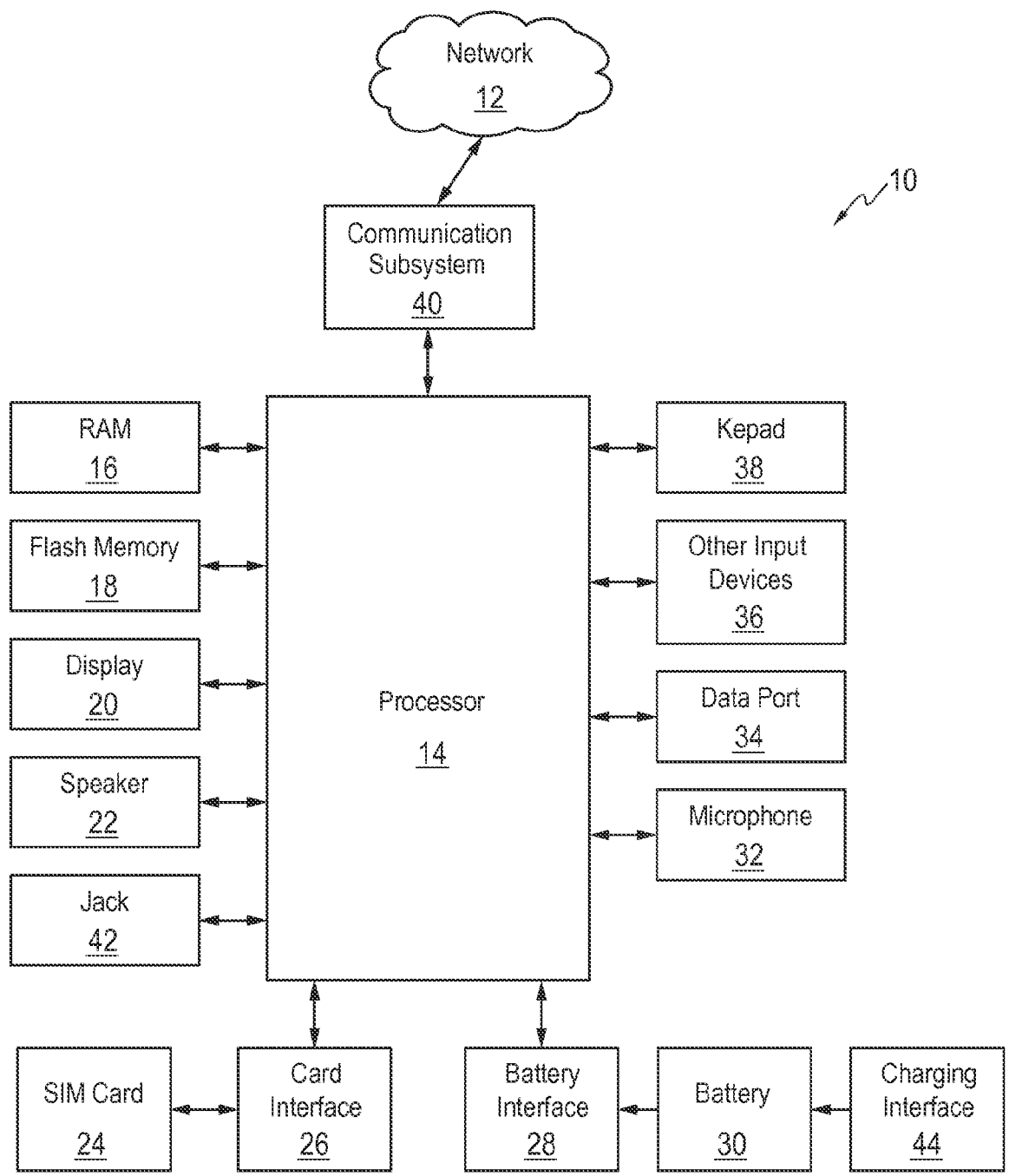
FIG. 1 is a block diagram of an example portable electronic device.

Referring to FIG. 1, components of an example portable electronic device 10 are generally shown. The portable electronic device is just one of many electronic devices that may use a charger having stowable prongs, and in some cases, the portable electronic device itself may include stowable prongs. The portable electronic device 10 includes data communication capabilities and may communicate with other electronic devices directly or through a wireless network. The portable electronic device 10 is based on the computing environment and functionality of a handheld computer, such as a wireless personal digital assistant (PDA), for example. It will be understood, however, that the portable electronic device 10 is not limited to a wireless personal digital assistant. Other portable electronic devices are possible, such as cellular telephones, smart telephones, electronic messaging devices, music players, gaming devices, remote controls and laptop computers, for example.

The portable electronic device 10 includes a number of components including a processor 14, which controls the overall operation of the device 10. A communication subsystem 40 controls data and voice communication functions, such as email, PIN (Personal Identification Number) message functions, SMS (Short Message Service) message functions and cellular telephone functions, for example. The communication subsystem 40 is in communication with a wireless network 12, which may be a data-centric wireless network, a voice-centric wireless network or a dual-mode wireless network.

In FIG. 1, the communication subsystem 40 is a dual-mode wireless network that supports both voice and data communications. The communication subsystem 40 is configured in accordance with the Global System for Mobile Communication (GSM) and General Packet Radio Services (GPRS) standards. The communication subsystem 40 may alternatively be configured in accordance with Enhanced Data GSM Environment (EDGE) or Universal Mobile Telecommunications Service (UMTS) standards. Other wireless networks may also be associated with the portable electronic device 10, including Code Division Multiple Access (CDMA) or CDMA2000 networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The wireless network 12 includes base stations (not shown) that provide a wireless link to the portable electronic device 10. Each base station defines a coverage area, or cell, within which communications between the base station and the portable electronic device 10 can be effected. It will be appreciated that the portable electronic device 10 is movable within the cell and can be moved to coverage areas defined by other cells. Data is delivered to the portable electronic device 10 via wireless transmission from the base station. Similarly, data is sent from the portable electronic device 10 via wireless transmission to the base station.

The communication subsystem 40 further includes a short range communications function, which enables the device 10 to communicate directly with other devices and computer systems without the use of the wireless network 12 through infrared or Bluetooth™ technology, for example.

Prior to the portable electronic device 10 being able to send and receive communication signals over the wireless network 12, network registration or activation procedures typically have been completed. In order to enable network communication, a SIM (Subscriber Identity Module) card 24 is inserted into a card interface 26. The SIM card, or Removable User Identity Module card, is used to identify the user of the mobile device, store personal device settings and enable access to network services, such as email and voice mail, for example, and is not bound to a particular portable electronic device 10.

The processor 14 is also connected to a Random Access Memory (RAM) 16 and a flash memory 18. An operating system and device software are typically stored in flash memory 18 and are executable by the processor 14. Some device software components may alternatively be stored in RAM 16. The portable electronic device 10 includes computer executable programmed instructions for directing the portable electronic device 10 to implement various applications. Some examples of applications that may be stored on and executed by the device 10 include: electronic messaging, games, calendar, address book and music player applications. Software applications that control basic device operation, such as voice and data communication, are typically installed during manufacture of the device 10. For devices that do not include a SIM card 24, user identification information may be programmed into the flash memory 18. The flash memory 18 may alternatively be a persistent storage, a Read-Only Memory (ROM) or other non-volatile storage.

The processor 14 receives input from various input devices including a keypad 38 and other input devices 36. The keypad 38 may be a complete alphanumeric keypad or telephone-type keypad. The other input devices 36 may replace or complement the keypad 38 to facilitate input and may include devices such as: single or multi-function buttons, a touch screen, a mouse, a trackball, a capacitive touch sensor or a roller wheel with dynamic button pressing capability. The portable electronic device 10 of FIG. 1 is shown by way of example and it will be appreciated by a person skilled in the art that many different device types, shapes and input device configurations are possible.

The processor 14 outputs to various output devices including an LCD display screen 20. A microphone 32 and speaker 22 are connected to the processor 14 for cellular telephone functions. A data port 34 is connected to the processor 14 for enabling data communication between the portable electronic device 10 and another computing device.

Figure 2:
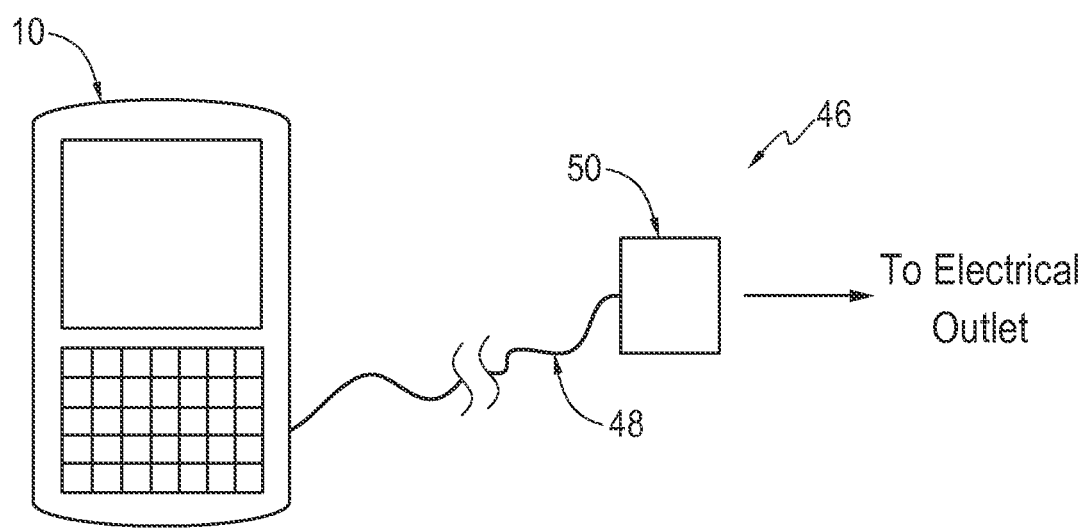
FIG. 2 is a schematic view of a charging device coupled to the portable electronic device of FIG. 1.

The power pack for portable electronic device 10 may be any kind of power pack, typically having one or more rechargeable elements. For simplicity, the power pack will be illustrated as one or more rechargeable batteries 30. Battery interface 28 enables electric communication between one or more rechargeable batteries 30 and the processor 14, that is, the battery interface 28 enables electric power to be delivered from one or more rechargeable batteries 30 to the processor (and perhaps other electrical components as well). A charging interface 44 provides a connection between the rechargeable battery 30 and a charger device 46, which is shown in FIG. 2, when the battery 30 is being recharged. The data port 34 may be incorporated into the charging interface 44 to provide data lines for data transfer and a supply line for charging a battery 30 of the portable device 10.

The portable electronic device 10 is operable in a data communication mode and a voice communication mode. In the data communication mode, a received data signal representing information such as a text message, an email message, a media file to be transferred, or web page download is processed by the communication subsystem 40 and input to the processor 14. The processor 14 further processes the signal and renders images for display on the display screen 20. Alternatively, the processed signals may be output to another computing device through the data port 34. In order to transmit information in the data communication mode, the user of the portable electronic device 10 composes information for transmission, such as email messages, for example, using the keypad 38 and other input devices 36 in conjunction with the display screen 20. The composed information is transmitted through the communication subsystem 40 over the wireless network 12 or via short range communications. Operation of the portable electronic device 10 in the voice communication mode is similar to the data communication mode, however, the received signals are output to the speaker 22, or an auxiliary device such as a headset or headphones, and signals for transmission are generated by the microphone 32. The portable electronic device 10 may also include other voice subsystems, such as a voice message recording subsystem, for example. Jack 42 is provided for receiving an audio accessory such as headphones, a headset, amplified speakers or amplified headphones, for example. Jack 42 may also receive other accessories such as a multi-media accessory including play, pause, stop and rewind buttons or a TV-out accessory that allows for connection of the portable electronic device to a TV, for example.

Only a limited number of device subsystems have been described. It will be appreciated by a person skilled in the art that additional subsystems corresponding to additional device features may also be connected to the processor 14. Further, although many subsystems that use electrical power have been described, the concepts described herein may be applicable to devices that include subsystems that use electrical power, even if such subsystems have not been specifically described.

Referring to FIG. 2, a charger device 46 is generally shown coupled to the portable electronic device 10. The charger device 46 includes a charger unit 50 and a cable 48 for connecting the charger unit 50 to the portable electronic device 10. The cable 48 includes a connector (not shown) for coupling to the charging interface 44 of the portable electronic device 10. Connectors of this type are well known in the art and therefore will not be described further here. The charger device 46 may be used with any type of portable electronic device 10 that includes a rechargeable power pack. Examples of portable electronic devices 10 include: personal data assistants (PDAs), smart phones, handheld computers, two-way pagers, music players and cellular telephone, for example. Typically the charger device 46 includes one or more electrical components for electrically communicating with the portable electronic device 10. That is, the charger device 46 may include components that convey and/or condition power from an outlet to enable charging of the power pack of the portable electronic device 10. Such electrical components may include components such as wires or other conductors, transformers, rectifiers and voltage regulators.

Figure 3:
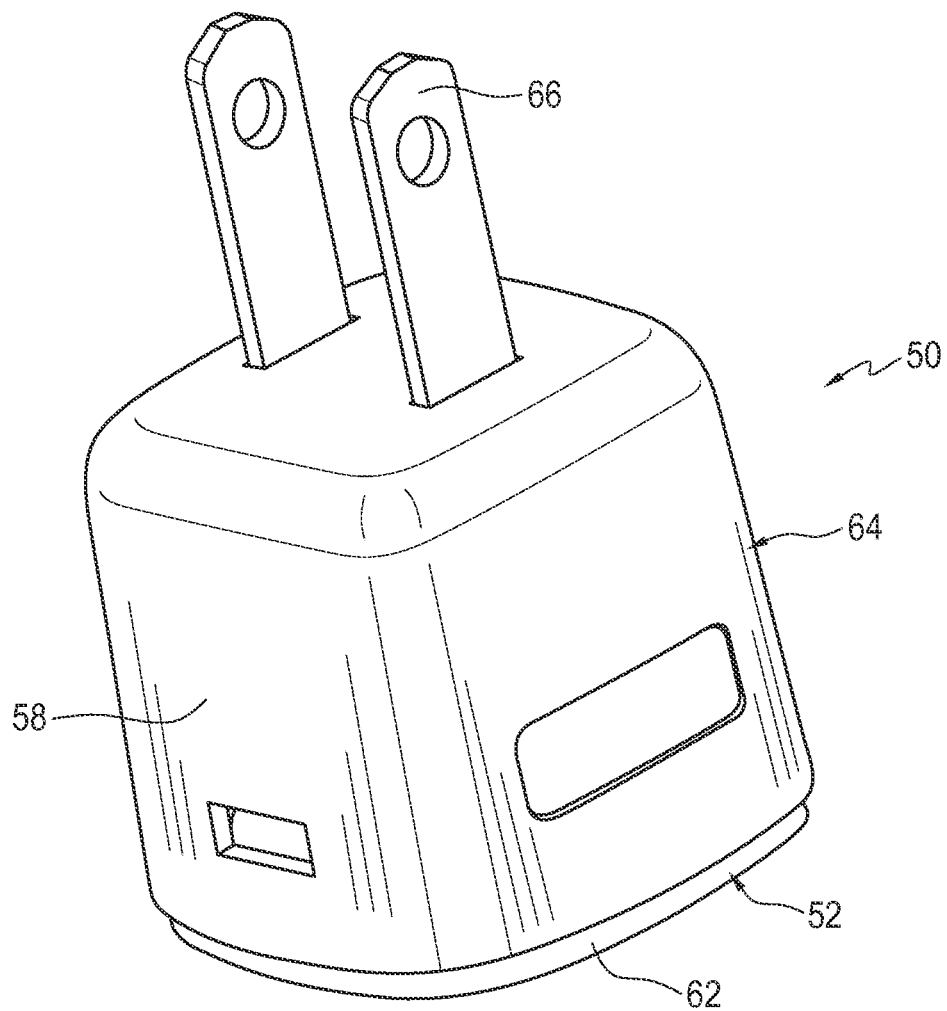
FIG. 3 is an isometric view of a charger unit according to an embodiment.
Figure 4:
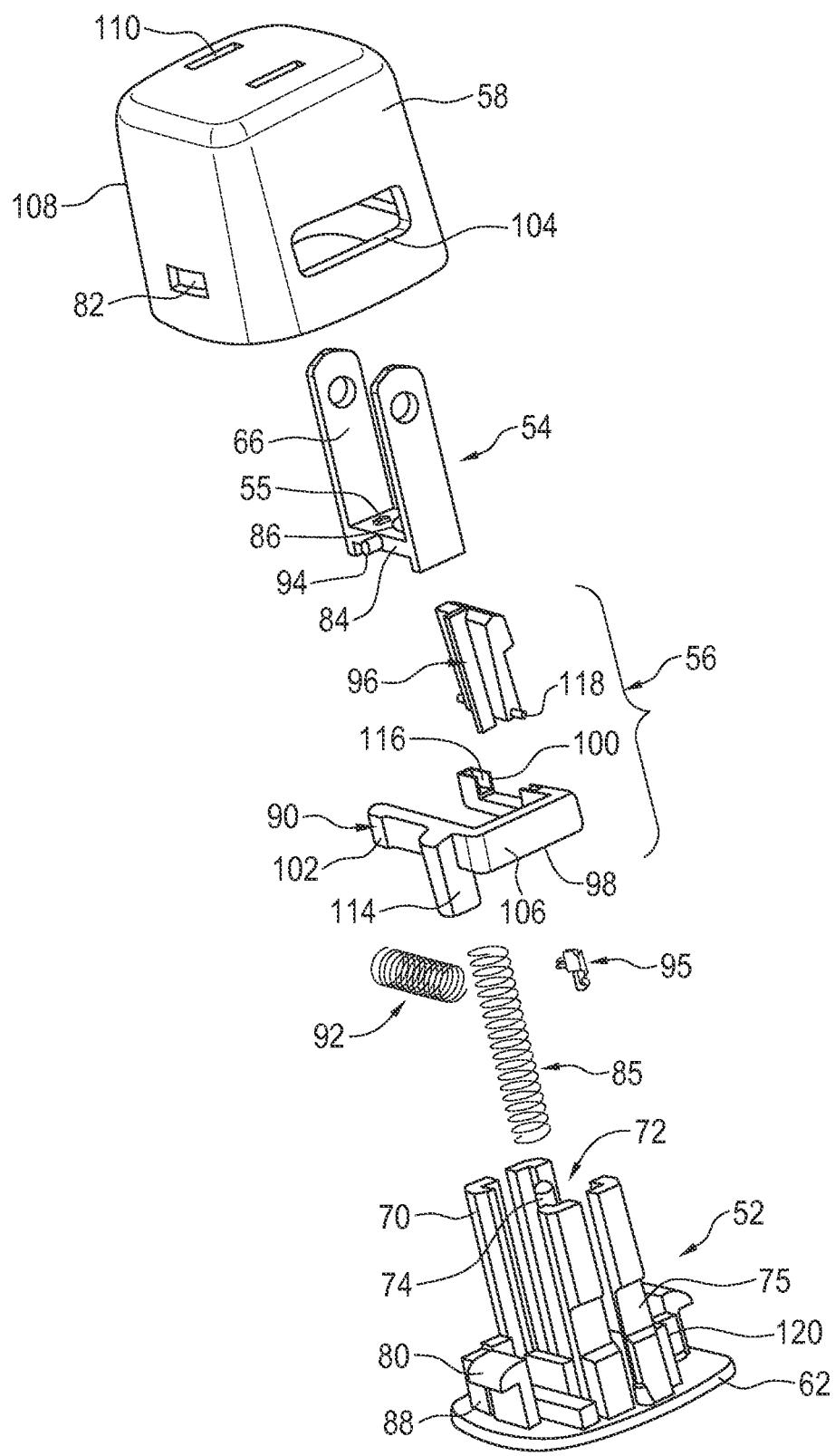
FIG. 4 is an exploded view of the charger unit of FIG. 3 with electrical components omitted.

As shown in FIGS. 3 and 4, the charger unit 50 includes a base 52, a prong unit 54, a locking mechanism 56 and a cover 58 that is coupled to the base 52. When assembled, the cover 58 and an end plate 62 of the base 52 provide a housing 64 that may be handled by a user of the portable electronic device 10 when plugging prongs 66 of the charger unit 14 into an electrical outlet (not shown). A prong unit spring 85, a locking mechanism spring 92 and a locking member spring 95 are further provided within the housing 64.

The base 52 includes four prong unit guides 70 that extend from the end plate 62 of the base 52. The prong unit guides 70 define a passage 72 that is sized for slidably receiving the prong unit 54. A post 74 extends generally from a centre of the end plate 62 and base flange 88 extends upwardly from the end plate 62 to act as a stopper for the locking mechanism spring 92.

The base 52 further includes detents 80 that are coupled to the end plate 62. The detents are sized for mating with apertures 82, which are provided on opposite sides of the cover 58. The detents 80 are received in the apertures 82 to hold the cover 58 and the base 52 together when assembled, as shown in FIG. 3. Alternatively, the base 52 and cover 58 may be coupled to one another using an adhesive or an ultrasonic welding process.

Prongs 66 of the prong unit 54 are coupled to one another by a cross-member 84. The cross-member 84 is generally rectangular in cross-section, however, may alternatively be circular, oval, square or any other suitable shape. The cross-member 84 includes an aperture 86 for receiving the post 74. A projection 94 extends outwardly from the cross-member 84. The projection 94 is generally cylindrical in shape, however, may alternatively be oval or diamond shape, for example. The prong unit 54 is slidable relative to the base 52 along a longitudinal axis of the post 74 to move the prongs 66 into and out of the housing 64. Spacers 55 are coupled to the cross-member 84 for abutting an inner surface of the cover 58.

The locking mechanism 56 includes a carriage 90, a locking member 96 and the locking member spring 95. The carriage 90 includes an end 98 that is provided between a first arm 102 and a second arm 100. The end 98 of the locking mechanism 56 is aligned with a cutout 104 of the cover 58 so that it is accessible by the user to function as a button. The prong unit guides 70 that are located adjacent to the end 98 of the carriage 90 are provided with cutouts 75, which allow the locking mechanism 56 to slide a predetermined distance into the charger unit 50.

Figure 5:
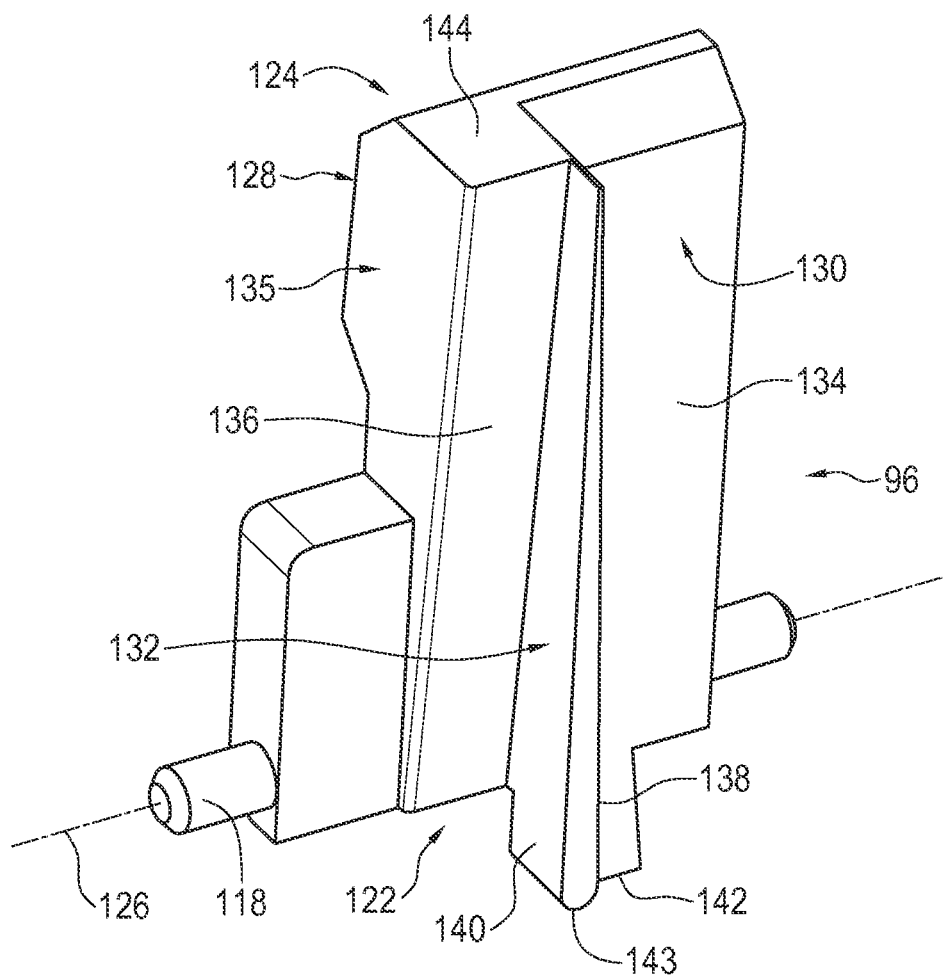
FIG. 5 is an isometric view of the locking member of the charger unit of FIG. 3.
Figure 6:
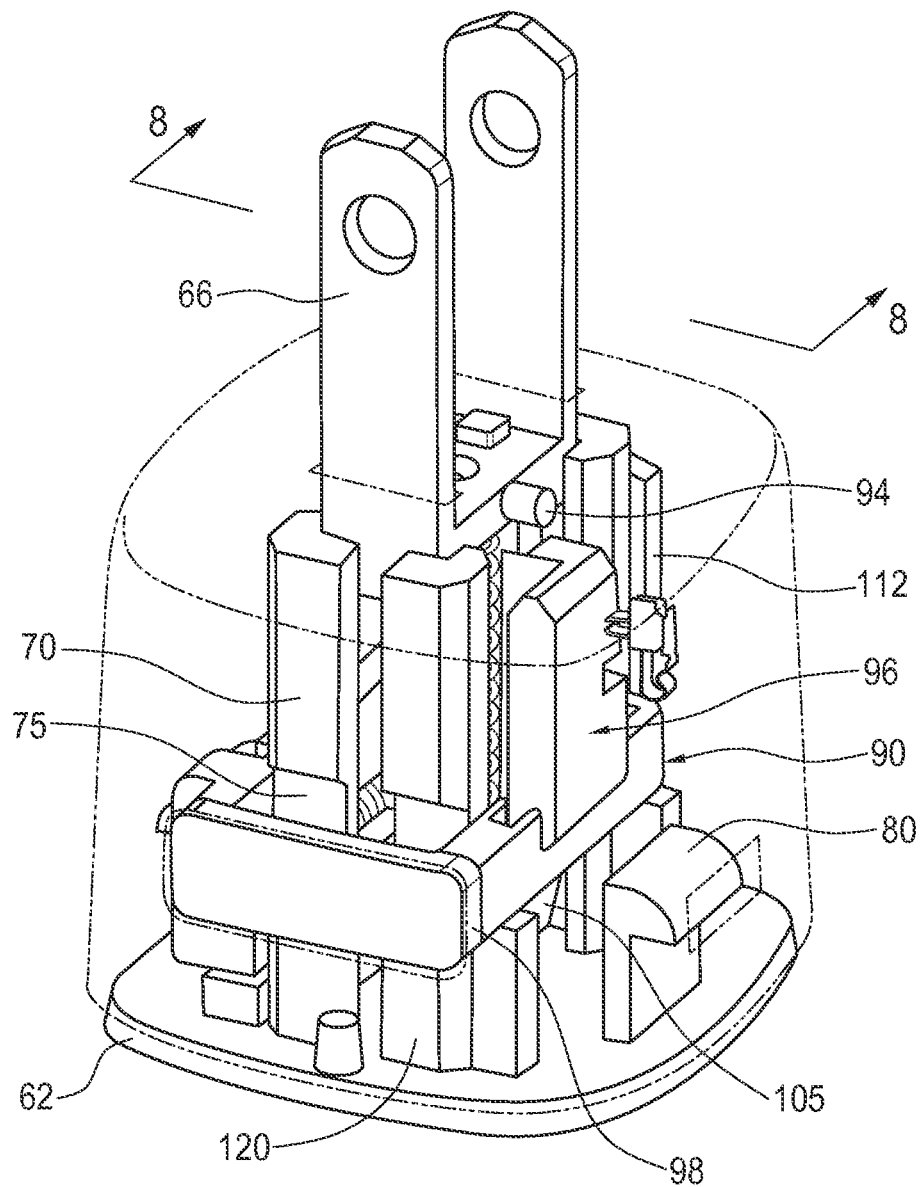
FIG. 6 is an isometric view of the charger unit of FIG. 3 with a cover removed.
Figure 7:
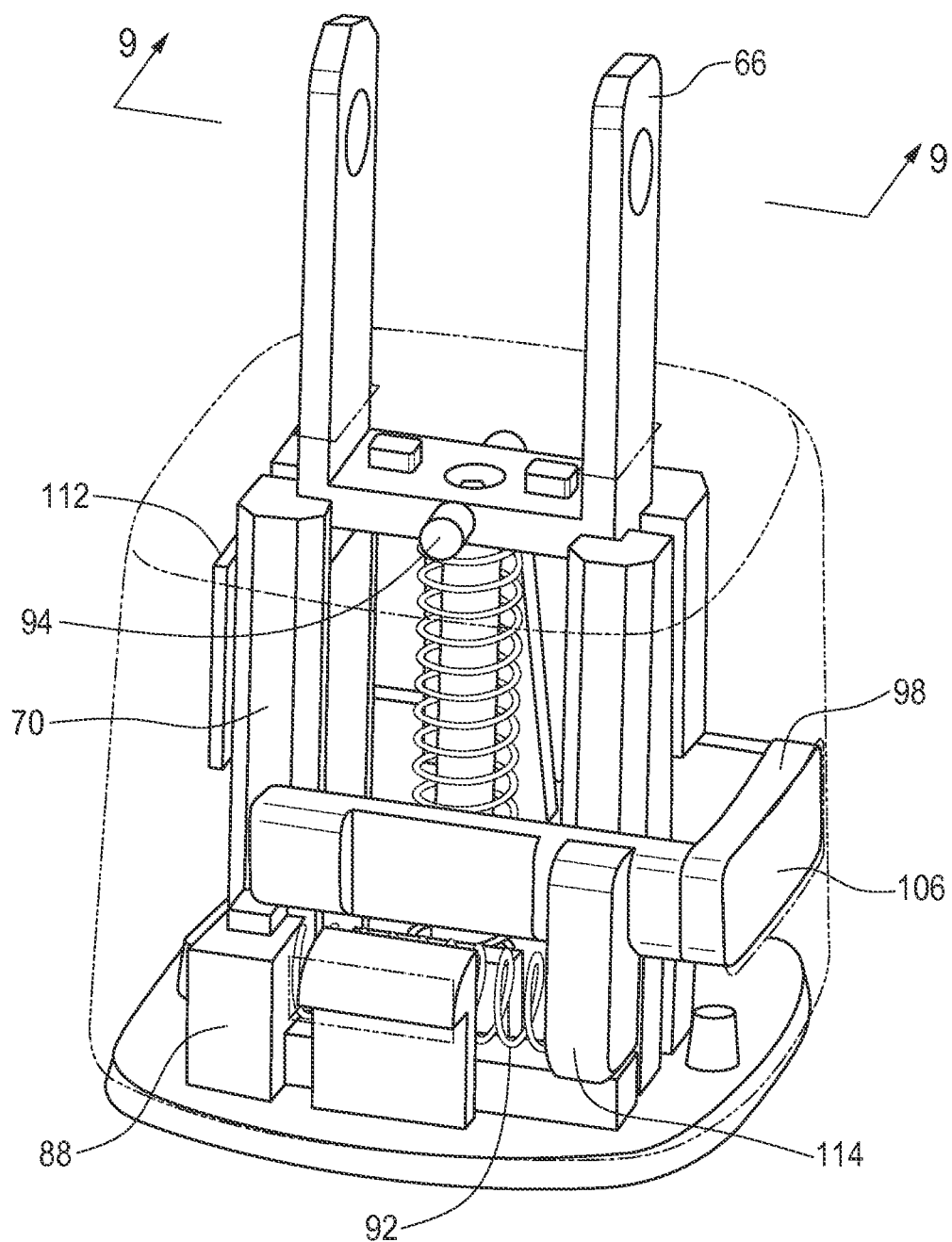
FIG. 7 is another isometric view of the charger unit of FIG. 3 with the cover removed.

Referring also to FIGS. 5, 6 and 7, the second arm 100 of the locking mechanism includes a pair of recesses 116, for receiving pins 118 of the locking member 96, and a stopper 105, which extends toward the base plate 62 when the charger unit 50 is assembled. A spring abutting portion 114 extends from the first arm 102. When assembled, the spring abutting portion 114 is aligned with the base flange 88 to define a recess for receiving the locking mechanism spring 92.

The locking member 96 is a multi-faceted part that includes a first end 122 including the pins 118 and a second end 124 that is pivotable about a pin axis 126 when the locking member 96 is coupled to the carriage 90. The locking member spring 95 biases the locking member 96 toward a locked position. The locking member 96 includes a rib 132, which is provided on an inner side 130 of a locking member body 135. The rib 132 divides the inner side 130 into a first surface 134 and a second surface 136 to separate a first travel path and a second travel path, as will be described later. Referring also to FIG. 6, an outer side 128, which is opposite the inner side 130 is generally perpendicular to the base plate 62 when assembled in the charger device 50 and in the locked position. The first surface 134 is generally parallel to the outer side 128 and the second surface 136 is disposed at an angle thereto such that a height of the rib 132 relative to the second surface decreases between the first end 122 and the second end 124. The rib 132 includes a second rib surface 138 and a first rib surface 140. The second rib surface 138 is adjacent to the first surface 134 and is disposed at an angle. The first rib surface 140 is adjacent to the second surface 136 and is generally perpendicular to the outer side 128. As shown in FIG. 5, a portion of the rib 132 extends beyond the locking member body 135 and includes a first locking surface 142 that is adjacent to a first locking surface stop 143. A second locking surface 144 is provided at the second end 124.

The locking member 96 may be a molded piece, or alternatively, the locking member may be manufactured using another suitable method such as milling or machining, for example.

The locking mechanism 56 is movable between a first position and a second position and is biased toward the first position by the first locking spring 92. In the first position, the end surface 106 is generally flush with an outer surface 108 of the cover 58. In the second position, the end surface 106 is received within the housing 64. The locking member 96 is biased toward the locked position by the locking member spring 95, which is coupled to an inner surface of the cover 58 adjacent to the locking member 96 and contacts the outer side 128 of the locking member 96 adjacent to the second end 124 of the locking member 96.

Referring to FIGS. 6 and 7, electrical components 112 of the charger unit 50 are shown schematically. The electrical components 112 include an electrical contact part (not shown) for contacting the prongs 66 and electrical components provided between the electrical contact part and the cable 48 of the charger device 46 for transferring electrical energy from the electrical outlet to the portable electronic device 10. The electrical contact part may be a metal spring contact or a brush similar to a brush of an electric motor, for example. The electrical components 112 of charging devices are well known in the art and therefore will not be described further herein. An aperture (not shown) is provided in the housing 64 to allow for communication between the cable 48 and the electrical components 112.

Figure 8:
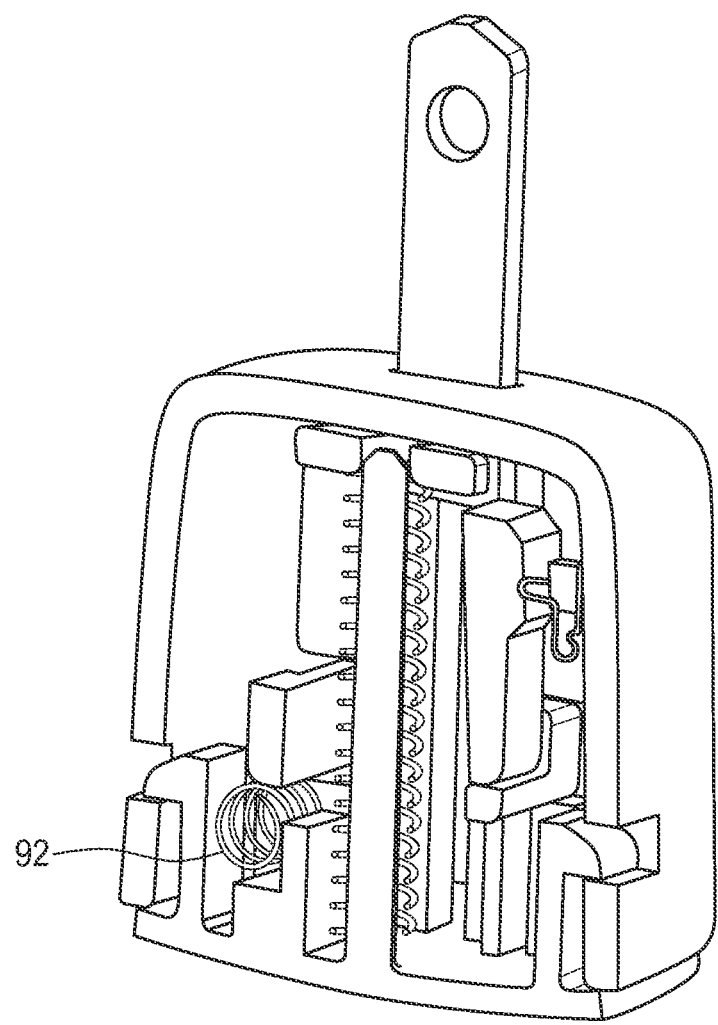
FIG. 8 is an isometric sectional view on 8-8 of FIG. 6.
Figure 9:
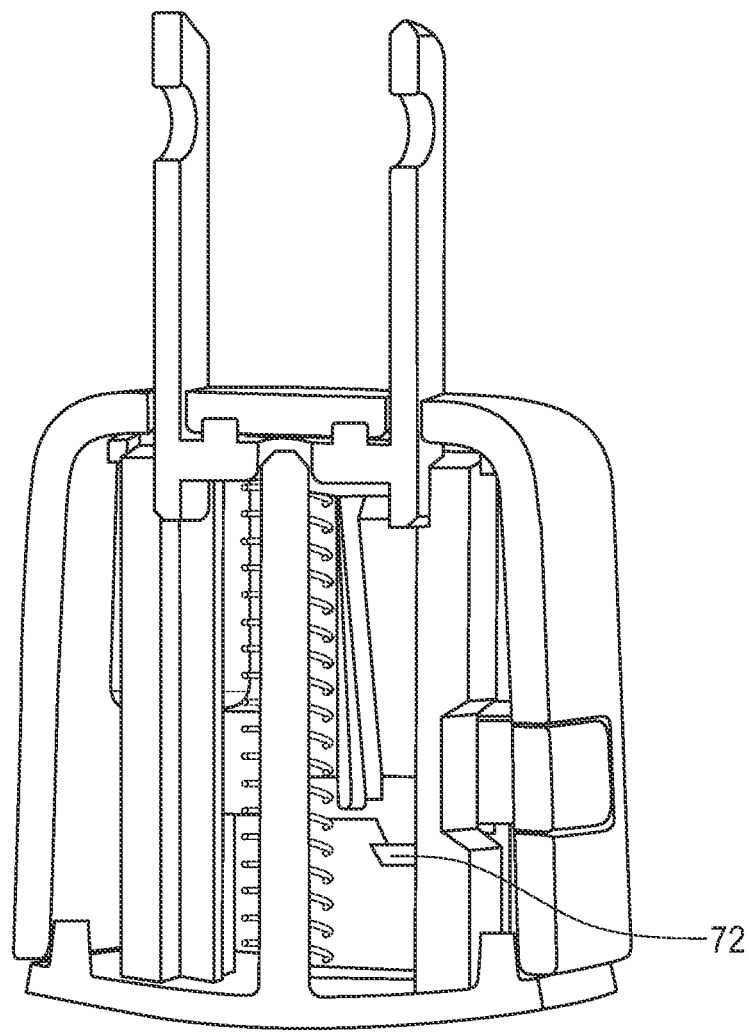
FIG. 9 is an isometric sectional view on 9-9 of FIG. 7.

Referring also to FIGS. 8 and 9, when assembled, the prong unit 34 and the prong unit spring 85 are received over the post 74 of the base 52. The pins 118 of the locking member 96 are received in the corresponding grooves 116 of the carriage 90 and the carriage 90 rests on supports 120, which extend from the end plate 62 of the base 52.

The prongs 66 of the charger unit 50 are movable between an extended position and a retracted position and are biased toward the extended position by the prong unit spring 85. In the extended position, the prongs 66 protrude through slots 110 of the cover 58. In the retracted position, the prongs 66 are received within the housing 64. The prongs 66 in the retracted position may be, but need not be, completely received within the housing 64. In one embodiment discussed below, a comparatively small portion of the prongs 66 may protrude through one or more slots 110, so that the user may apply a force against the prongs 66 to release them into the extended position. When the prongs 66 are in the extended position, the projection 94 abuts the second locking surface 144 located at the second end 124 of the locking member 96. When the prongs are in the retracted position, the projection 94 abuts the first locking surface 142 at the first end 122 of the locking member 96.

In the embodiments described herein, there is one general mode of operation for moving the prongs 66 from the extended position to the retracted position and two general modes of operation for moving the prongs 66 from the retracted position to the extended position. A single device may employ one or both modes for moving the prongs 66 to the extended position.

Figure 10:
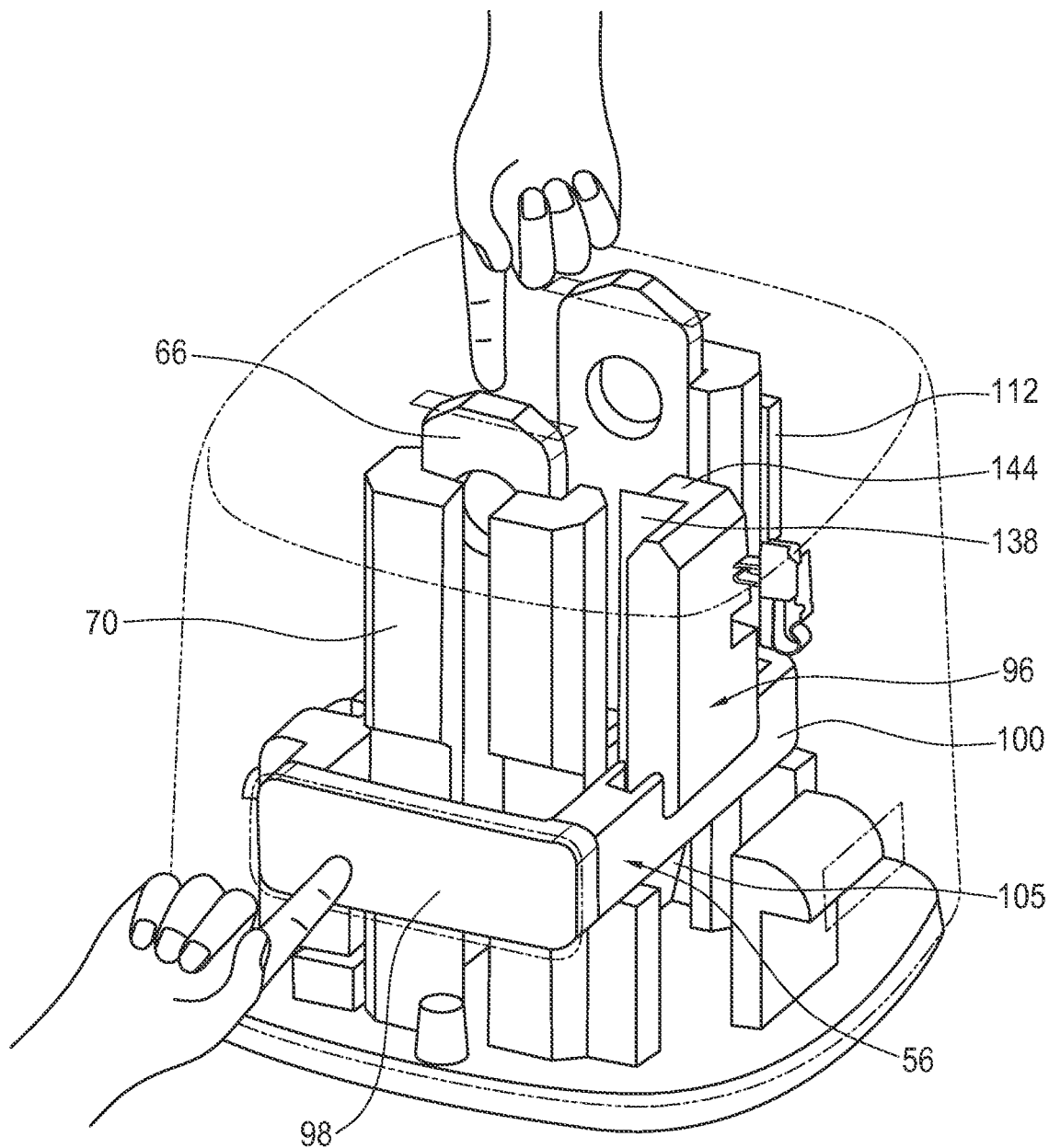
FIG. 10 is an isometric view illustrating operation of the charger unit of FIG. 3.
Figure 11A:
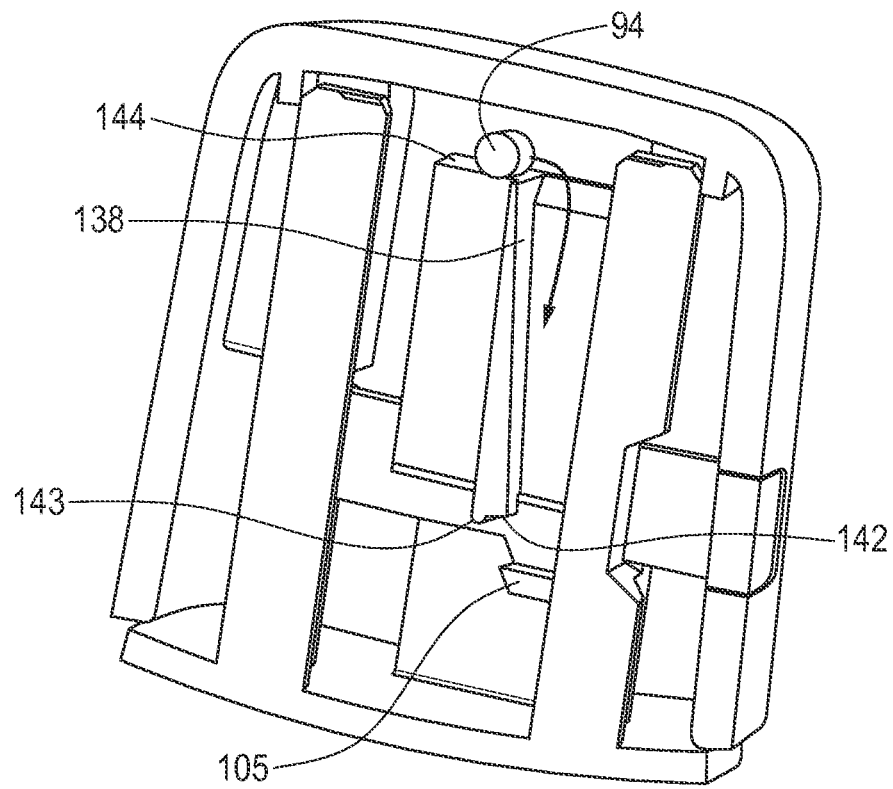
FIG. 11A is an isometric sectional view illustrating operation of the charger unit of FIG. 3.
Figure 11B:
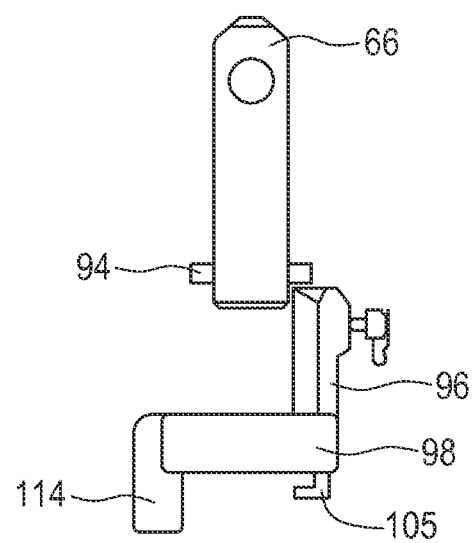
FIG. 11B is a side view of portions of FIG. 10.
Figure 12A:
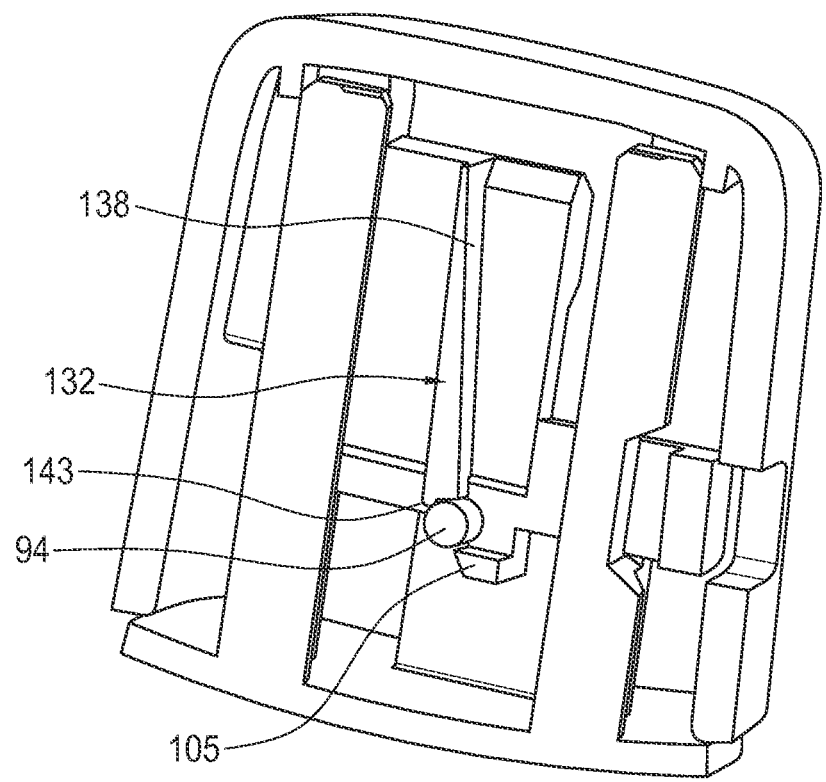
FIG. 12A is another isometric sectional view illustrating operation of the charger unit of FIG. 3.
Figure 12B:
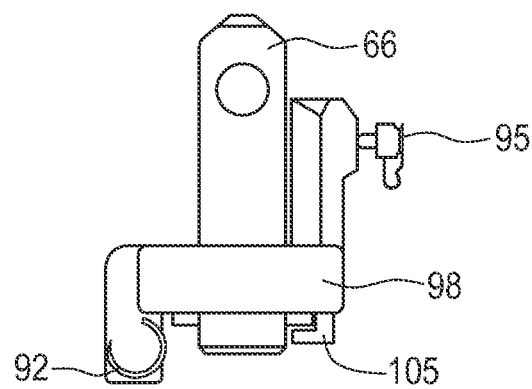
FIG. 12B is another side view of portions of FIG. 10.

When charging of the portable electronic device 10 has finished and the user wishes to stow the charger device 46, the user operates the charger unit 50 as shown in FIG. 10 in order to move the prongs 66 from the extended position to the retracted position. The user first pushes the end 98 of the locking mechanism 56 into the housing 64 to move the second locking surface 144 of the locking member 96 out of engagement with the projection 94 of the prong unit 54, as shown in FIGS. 11A and 11B. The user then pushes the prongs 66 into the housing 64 and releases the locking mechanism 56. As the prongs 66 are being pushed into the housing 64, the projection 94 slides along the second rib surface 138 of the rib 132 until it reaches the end thereof and abuts the stopper 105. When the projection 94 has moved beyond the first locking surface 142 of the rib 132, the locking mechanism spring 92 causes the locking mechanism 56 to move part way back to its starting position. This causes the projection 94 to engage the first locking surface 142 of the rib 132, which locks the prongs 66 in the retracted position, as shown in FIGS. 12A and 12B. In this position, the locking mechanism 56 is generally prevented from moving back to its starting position by the first locking surface stop 143.

Figure 13:
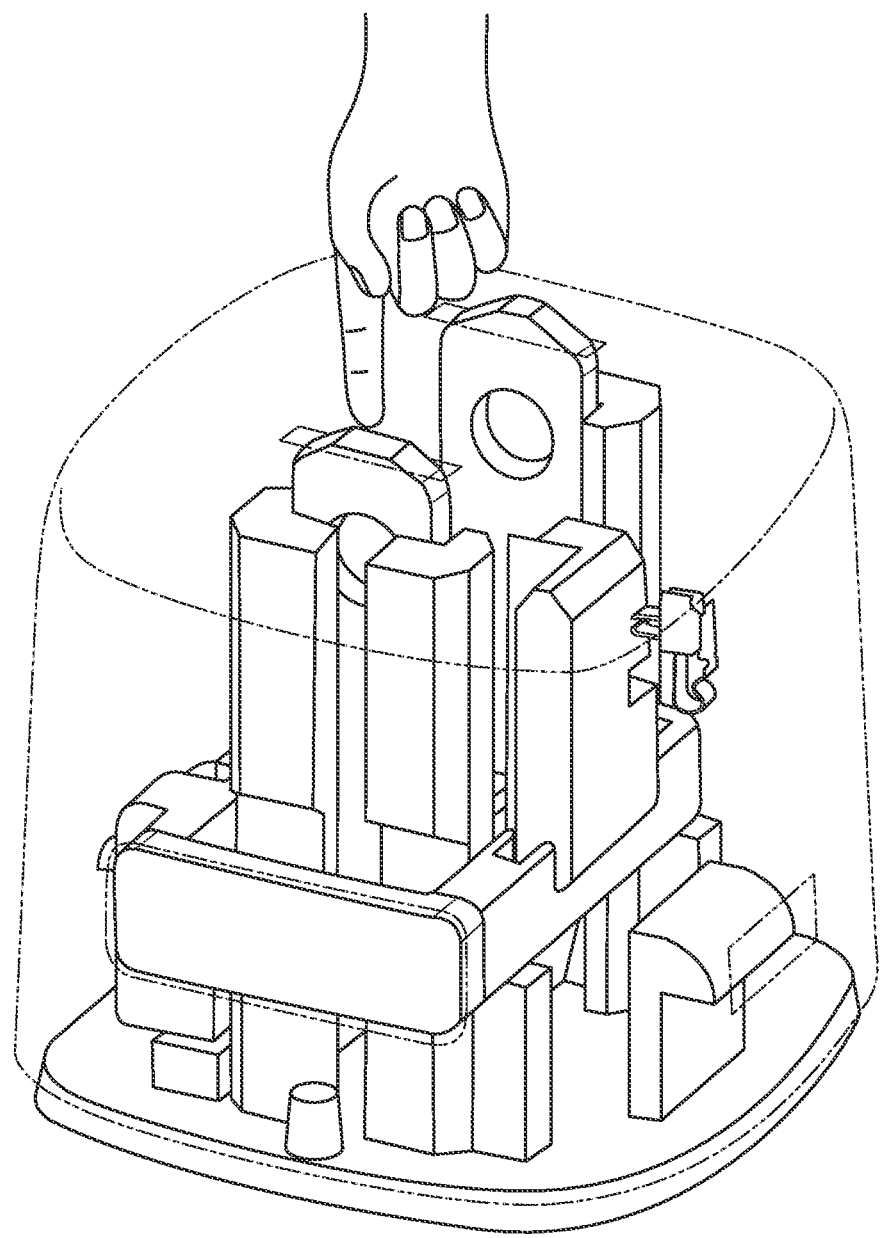
FIG. 13 is an isometric view of the charger unit of FIG. 3 illustrating operation in a first extending mode.
Figure 14A:
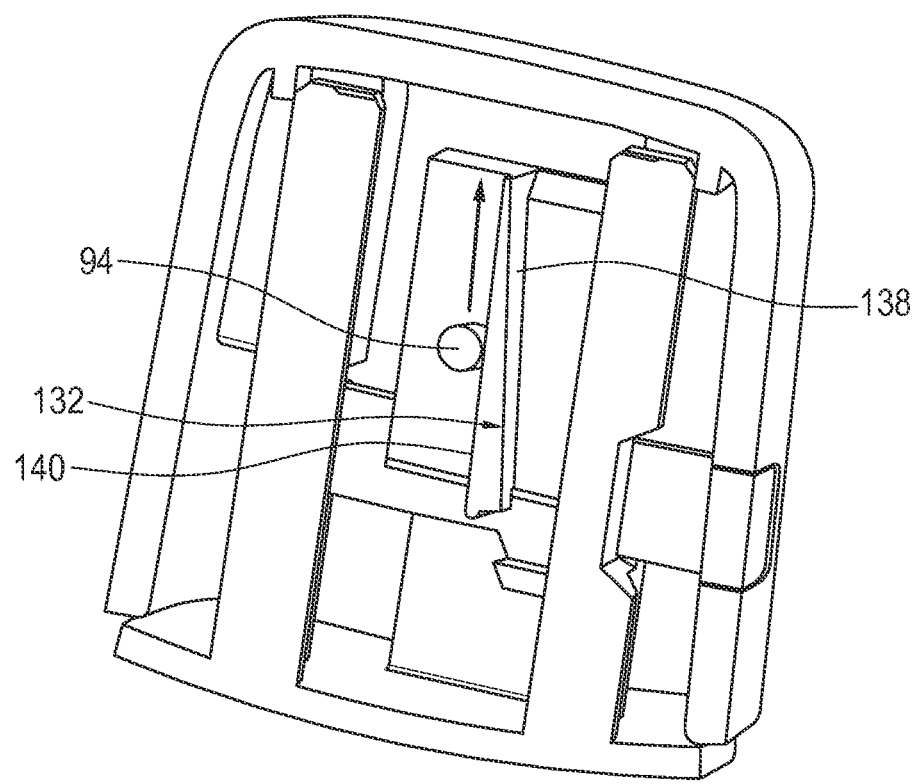
FIG. 14A is an isometric sectional view of the charger unit of FIG. 3 illustrating operation in the second extending mode.
Figure 14B:
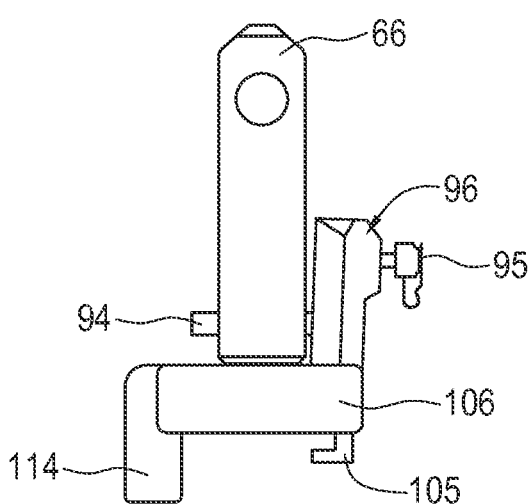
FIG. 14B is a side view of portions of FIG. 14.

Operation of the first mode for releasing the prongs 66 to the extended position is shown in FIG. 13. This mode may be referred to as a "push push" mode because the user pushes the prongs once to stow the prongs, and pushes the prongs again to release them into the extended position. The user pushes the prongs 66 further into the housing 64 to move the projection 94 beyond the first locking surface stop 143 of the locking member 96, which allows the locking mechanism 56 to return to its starting position in which the end surface 106 is generally flush with the outer surface 108 of the cover 58. The prong unit spring 85, which biases the prongs 66 to the extended position, forces the projection 94 to move along the first travel path in which the projection 94 slides along the first rib surface 140 of the rib 132, as shown in FIGS. 14A and 14B. Contact between the projection 94 and the angled second surface 136 forces the locking member 96 to pivot away from the prong unit 54 toward the inner surface of the cover 58. Once the projection 94 slides beyond the locking member 96, the locking member 96 returns to its starting position under the force of locking member spring 95. The projection 94 then rests on the second locking surface 144 to lock the prongs 66 in the extended position. In this position, movement of the prongs 66 into the housing 64 is restricted by the locking member 96. The prongs 66 of the charger device 46 may then be plugged into an electrical outlet. The battery of the portable electronic device 10 may then be charged when the cable 16 is connected thereto.

Figure 15:
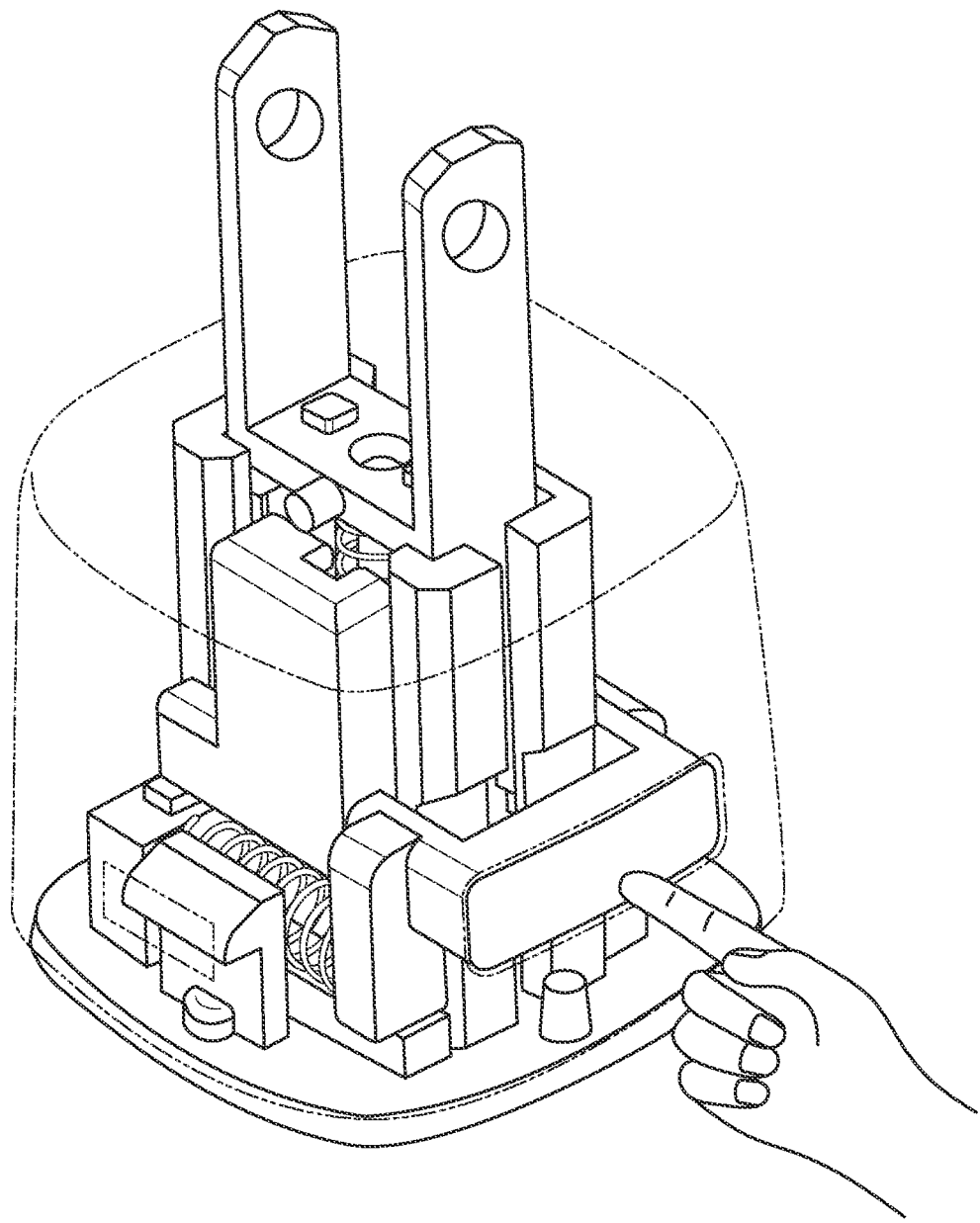
FIG. 15 is an isometric view of the charger unit of FIG. 3 illustrating operation in a second extending mode.

Operation of the second mode for releasing the prongs 66 to the extended position is shown in FIG. 15. In this mode, the user typically pushes the prongs to stow the prongs, but does not touch the prongs to release them into the extended position. Instead, the user pushes the end 98 of the locking mechanism 56 into the housing 64 to move the locking member 96 out of engagement with the projection 94 and release the prongs 66. The prong unit spring 85 then forces the projection 94 to move along the second travel path in which the projection 94 slides along second rib surface 138 of the rib 132. Once the projection 94 slides beyond the locking member 96, the locking mechanism spring 92 forces the locking mechanism 56 into its extended position causing the projection 94 to rest on the second locking surface 144, which locks the prongs in the extended position. In this position, movement of the prongs 66 into the housing 64 is restricted by the locking member 96. The prongs 66 of the charger device 46 may then be plugged into an electrical outlet. The battery of the portable electronic device 10 may then be charged when the cable 16 is connected thereto.

The base 52, the cover 58 and the locking member 56 and may be injection molded using a non-conductive material. A suitable plastic, such as polycarbonate or ABS, for example, may be used. The prongs 66 are made of an electrically conductive metal, such as steel, stainless steel or brass, for example.

In one embodiment, the end surface 106 of the locking mechanism 56 is a different color than the housing 64 so that the user is able to quickly locate the end 98. In another embodiment, a word, such as "PUSH", for example, is provided on the end surface 106. Alternatively, a logo, symbol or other characters may be provided on the end surface 106. In still another embodiment, the end surface 106 is textured to facilitate location thereof by a user who is not looking at the charger unit 50. It will be appreciated by a person skilled in the art that these and other features for facilitating user-location of the button may be provided. In addition, the end 98 may be any shape that provides a useable surface that a user may press. The end surface 106 may include protruding features such as waves, dimples or big patterns that allow for quick and easy user location of the button.

The retractable prongs 66 of the charger device 46 allow the overall size of the device 46 to be reduced. This is particularly useful when traveling because the charger device 46 may be comfortably carried in the user's pocket or may take up only a small portion of a user's luggage.

Another potential advantage is that by providing a retracted position for the charger device 46, the chance of snagging the prongs 66 on clothing or damaging luggage contents is reduced.

Another potential advantage of the charger device 46 is that the prongs 66 can be extended using one hand in both modes: a single push of the end 98 or a push of the prongs 66 further into the housing 64 extends the prongs 66 from a retracted position. Further, the chance of accidental stowing of the prongs is reduced by one or more physical features described above. For example, a user's action of inserting the prongs into an electrical outlet (whether due to friction with the outlet or misalignment of the prongs with the respective sockets) will not ordinarily cause the prongs to be stowed.

Further, both the extending and retracting actions can be performed in situations where vision is limited by tactilely locating the end 98.

Specific embodiments have been shown and described herein. However, modifications and variations may occur to those skilled in the art. All such modifications and variations are believed to be within the scope and sphere of the present embodiments.

The invention claimed is:

1. An electrical device comprising:
   a housing comprising a cover coupled to a base;
   guides extending from the base defining a passage;
   prongs for engaging an electrical outlet, the prongs being coupled to one another by a cross-member and being slidably received in the passage, the prongs and the cross-member being movable relative to the housing between a retracted position in which the prongs are received in the housing and an extended position in which the prongs protrude from the housing, the prongs being biased toward the extended position by a spring;
   a projection extending from a side of the cross-member;
   a carriage received in the housing and movable relative to the guides, the carriage being movable between a first position and a second position and being biased toward the first position by a carriage spring;
   a locking member pivotably coupled to the carriage, the locking member comprising a first locking surface for abutting the projection to lock the prongs in the extended position when the carriage is in the first position, a second locking surface for abutting the projection to lock the prongs in the retracted position when the carriage is in a position part way between the first position and the second position and a rib separating a first travel path and a second travel path, the first travel path and the second travel path extending between the first locking surface and the second locking surface, the locking member being pivotable away from the prongs when the projection slides along the first travel path and being biased toward a non-pivoted position by a locking member spring; and
   electrical components for electrically communicating with a portable electronic device;
   wherein the prongs are movable from the retracted position to the extended position along the first travel path and along the second travel path.

2. An electrical device as claimed in claim 1, wherein the carriage is movable into a second position in which an end of the carriage is received in the housing and the projection is clear of the first locking surface and the second locking surface.

3. An electrical device as claimed in claim 1, wherein the first locking surface and the second locking surface are separated by the rib, the projection contacting the first locking surface and a first rib surface when moving along the first travel path and the projection contacting the second locking surface and a second rib surface when moving along the second travel path.

4. An electrical device as claimed in claim 1, wherein the rib divides an inner side of the locking member, the inner side being adjacent to the prongs.

5. An electrical device as claimed in claim 1, wherein the locking member spring is coupled to an inner surface of the housing.

6. An electrical device as claimed in claim 1, wherein to move the projection along the first travel path, the prongs are moved further into the housing from the retracted position.

7. An electrical device as claimed in claim 2, wherein to move the projection along the second travel path, the carriage is moved toward the second position.

8. An electrical device as claimed in claim 1, wherein the projection is generally cylindrical.

9. An electrical device as claimed in claim 1, comprising a post extending from the base, the post being received through an aperture of the cross-member.

10. An electrical device as claimed in claim 9, wherein the spring is received over the post to bias the prongs toward the extended position by abutting the cross-member.

11. An electrical device as claimed in claim 1, wherein an end of the carriage is aligned with a cutout of the cover to function as a button.

12. An electrical device as claimed in claim 11, wherein the end comprises tactile features.

13. An electrical device as claimed in claim 12, wherein the tactile features are at least one of: waves, dimples and big patterns.

14. An electrical device as claimed in claim 1, wherein the carriage is slidable on supports extending from the base.

* * * * *